Patented Aug. 17, 1937

2,090,430

UNITED STATES PATENT OFFICE 2,090,430

LYSERGIC ACID AMIDES AND PROCESS FOR THEIR MANUFACTURE

Arthur Stoll and Albert Hofmann, Basel, Switzerland, assignors to the firm Chemical Works formerly Sandoz, Basel, Switzerland No Drawing. Application August 25, 1936, Serial No. 97,845. In Switzerland June 20, 1936

13 Claims. (Cl. 260—25)

The present invention relates to new synthetic compounds similar or identical to the alkaloids obtainable from ergot (secale cornutum) and to a process for their manufacture.

The investigations carried out by W. A. Jacobs and his collaborators on the nature of ergot alkaloids have led to the isolation of some of the constituents, from which these alkaloids are built up. All of the alkaloids from ergot prepared until now in pure state contain lysergic acid, which according to the nature of the alkaloid is linked to phenylalanine, proline and isobutyrylformic acid or pyroracemic acid, and in the case of ergobasine only to 2-amino-propanol-1.

Until now no process was known, which would allow to link the physiologically practically inactive lysergic acid with a basic residue like an aminoalcohol or an amino acid in order to prepare compounds of the type of ergot alkaloids. This is first due to the fact that the lysergic acid is very difficult to prepare as it is only obtainable as a degradation product from ergot alkaloids and because its constitution is until now unknown.

Furthermore this acid is very sensitive, like the natural ergot alkaloids themselves, and becomes decomposed by light and the oxygen of the air and also on treatment with acids. Even in organic indifferent solvents like ethanol it becomes transformed slowly in the cold, rapidly on warming it up in a resinous mass, which can no more be used.

The usual methods for the preparation of acid amides cannot be used with lysergic acid. On trying to transform it into the acid halogenide it becomes transformed into a useless resin. By using lysergic acid methyl ester, which can be obtained from lysergic acid by treating it with diazomethane, no better result will be obtained, as under the conditions necessary for the preparation of acid amides, this compound becomes decomposed.

In our U. S. Patent appln. Serial No. 97,844, filed on August 25, 1936, we have described a process for the preparation of lysergic acid hydrazide, which is obtained by a heating of lysergic acid esters or amides with hydrazine hydrate. By this process it becomes possible to prepare a derivative of lysergic acid with a much superior yield as it has been possible until now and as the lysergic acid hydrazide is a stable and easily crystallizable product, it can easily be obtained in a very pure state. We have now found that by transforming the lysergic acid hydrazide by the usual methods into lysergic acid azide, a new compound will be obtained that is very suitable for the preparation of lysergic acid amides of the type of ergot alkaloids.

One object of the present invention is therefore a process for the manufacture of compounds of the type of ergot alkaloids, consisting in condensing lysergic acid azide with organic amines.

This process is preferably carried out in presence of an acid binding agent like sodium and potassium hydroxydes and carbonates or of an excess of the organic amine used for the reaction or an amine like pyridine, dimethylaniline, etc., sufficient to neutralize the hydroazoic acid formed by the interaction of the components and preferably at a temperature below 20° C., say under good cooling and at about 0° C.

It is further advantageous to carry out the condensation in presence of an inert solvent like water, methanol, ethanol, chloroform, benzene, etc.

Our investigations have shown that the highly active alkaloids from ergot like ergotamine, ergotoxine and ergobasine become first transformed on treatment with alkali or with hydrazine into their less active isomers ergotaminine, ergotinine and ergobasinine and that only thereon the splitting of the acid amide grouping occurs. Therefore by using lysergic acid azide for the synthesis of amides, compounds of the type ergotaminine, ergotinine and ergobasinine will be obtained first. But as it will be shown further there are several known methods allowing to transform these alkaloids into their high active isomers, and we have now succeeded for example to prepare the most utero-active alkaloid from ergot, the natural ergobasine.

The transformation of ergotaminine into ergotamine, of ergotinine into ergotoxine or of ergobasinine into ergobasine, or generally spoken of less active alkaloids into their highly active isomers is already known. By applying this transposition process to the lysergic acid hydrazide, used as starting compound and by transforming it thereon into the azide, the highly active compounds will be obtained in one operation.

As described in our aforesaid U. S. Patent application Serial No. 97,844, filed on August 25, 1936, the formation of lysergic acid hydrazide takes place under racemization quite indifferently if this compound is prepared for example from the optically active lysergic acid methylester or from natural alkaloids from ergot. The separation of the optical isomers can be carried out in the manner described below and naturally must always be adapted to the amides that are subjected to this separation process. By using optically active lysergic acid hydrazide, optically active acid amides will be obtained on transformation of the hydrazide into its azide and condensation of the same with the organic amines.

As organic amines those that contain at least one labile hydrogen attached to the nitrogen will be used and selected from the class of aliphatic, araliphatic aromatic, hydroaromatic and heterocyclic amines, which may be further substituted and which belong to the class of aminoalcohols and aminoacids. As especially suitable amines we have found those that react very easily with lysergic acid azide, this preferably at temperatures of about 0° C.

Another object of the present invention is therefore a process wherein racemic or optically active lysergic acid azide is condensed with organic amines to acid amides at a low temperature.

Still another object of our invention are the amides of lysergic acid when prepared according to the process herein described and which are in some cases identical with the natural alkaloids already isolated from ergot and in other cases are alkaloid-like compounds possessing valuable therapeutical properties.

The following examples, without being limitative, illustrate the present invention, the parts being by weight:

EXAMPLE 1

Preparation of racemic lysergic acid-ethanol amide 3 parts of the racemic lysergic acid hydrazide are transformed in the usual manner in a hydrochloric acid solution in its azide; the azide is then precipitated in form of voluminous yellowish flocks, by means of an addition of sodium bicarbonate, filtered and introduced at −5° C. into a solution of 6 parts of ethanolamine in 30 parts of ethanol. The azide dissolves very rapidly and the clear red-brownish solution thus obtained is slowly heated up to 30° C. and evaporated in vacuo. By treating the syrup-like residue with 20 parts of water, a sticky precipitation which becomes crystalline on standing in the cold for a day is obtained. The yield in raw racemic lysergic acid ethanolamide is of about 2.3–2.6 parts. In order to purify this substance, it is dissolved first in a small quantity of acetone in which it is easily soluble and crystallized. The greyish product thus obtained is then dissolved, in 1500 parts of hot benzene, filtered after addition of some charcoal through a talcum filter and allowed to cool down. The ethanol amide crystallizes out from benzene sometimes in form of hair fine needles of FP. 152–155° C. (corr.), sometimes on other tests in compact rhombic crystals of FP. 165–175° C. (corr.). This is only a polymorphous modification of one and the same substance, as they are differentiated one from the other type only by their crystal form and the melting point and can by inoculating their solutions be transformed in the desired modification.

From hot water, in which the lysergic acid ethanol amide is moderately soluble, it crystallizes out in form of hexagonal leaves. In dilute aqueous acid solution it is easily soluble, but insoluble in aqueous alkaline solutions.

The compound gives with glacial acetic acid containing traces of iron chloride, on addition of concentrated sulphuric acid, an intensive blue coloration (Keller's color-reaction) like the natural alkaloids from ergot. The analysis of this product has given the following values:

| Found | Calculated |
| --- | --- |
| Percent<br>C 68.91<br>   68.99<br>H  7.10<br>   6.95<br>N 13.54<br>   13.58 | Percent<br>C 69.41<br>H  6.80<br>N 13.50 |

The new compound possesses therefore the formula $C_{18}H_{21}O_2N_3$.

EXAMPLE 2

Preparation of racemic lysergic acid-isopropanol-amide 3.0 parts of lysergic acid hydrazide are transformed in the usual manner in azide and the latter introduced at −5° C. into a solution of 2 parts of racemic 2-aminopropanol-1 in 50 parts of ethanol. The reaction product is then worked up as described in Example 1 and gives 2.8 parts of raw racemic lysergic acid-isopropanolamide. In order to purify this substance the raw product is crystallized first from benzene, then from dichlorethylene and thereon again from benzene. The pure compound crystallizes out from benzene like the ethanolamide in two modifications, in fine rhombic leaves and in compact hexagonal crystals, both melting at 220–225° C. (corr.) under decomposition. The lysergic acid-isopropanolamide is more difficultly soluble in water, but better soluble in benzene as the respective ethanolamide. It gives the Keller's color reaction and possesses the formula $C_{19}H_{23}O_2N_3$. On analysis the following values have been obtained:

| Found | Calculated |
| --- | --- |
| Percent<br>C 70.41<br>   70.62<br>H  7.29<br>   7.42<br>N 12.69<br>   12.76 | Percent<br>C 70.11<br>H  7.13<br>N 12.92 |

EXAMPLE 3

Preparation of d-lysergic acid-d-isopropanol-amide

By allowing to react in the manner described in Example 2, the racemic lysergic acid azide with d-isopropanolamine, a mixture of isomers will be obtained which first does not crystallize. By subjecting this mixture to the chromatographic adsorption process, described for example in U. S. Patent application No. (Ser. No. 8214/35), the isomers may be separated one from the other and the fraction containing the dextrarotary substance concentrated in vacuo, dissolved in some acetone and left stand for crystallization. On inoculation with a small crystal of ergobasinine, the d-lysergic acid-d-isopropanol-amide begins to crystallize out in form of compact, clear, pointed prisms. After recrystallization from acetone or benzene, the compound is quite pure and melts under decomposition at 195–196° C. (corr.). The optical rotation measured in chloroform solution has given the following values:

$$[\alpha]_D^{20°C} = +431°; \quad [\alpha]_{5463}^{20°} = +523°$$

The analysis has confirmed the formula $C_{19}H_{23}O_2N_3$.

|  | Found | Calculated |
|---|---|---|
|  | Percent | Percent |
| C | 70.58 / 70.50 | 70.11 |
| H | 7.43 / 7.15 | 7.13 |
| N | 13.00 / 12.88 | 12.92 |

This compound is identical with ergobasinine, or ergometrinine described for the first time by S. Smith and G. M. Timmis, (Nature 136, 259, [1935]) and isolated from ergot extracts.

The synthetical ergobasinine prepared as described above can be transformed in the already known manner into the very active ergobasine (ergometrine).

EXAMPLE 4

*Preparation of lysergic acid-tyramide*

Lysergic acid azide prepared from 3 parts of lysergic acid hydrazide is introduced at 0° C. into a solution of 1.5 parts of tyramine in 110 parts of 0.1-n aqueous caustic soda solution and the reaction mixture is so long shaken that the whole azide has practically gone in solution. The clear filtered solution is then saturated at 0° C. with carbonic acid, whereby the tyramide of the lysergic acid precipitates out in crystalline form. By recrystallization from some acetone it can be obtained in pure state and crystallizes out from this solvent in form of compact oblique prisms decomposed on heating at 205–210° C. (corr.). This compound is easily soluble in diluted acids and also in diluted caustic alcaline solutions, this being due to the presence of a phenolic hydroxy group. It gives the Keller's reaction and responds to the formula $C_{24}H_{25}O_2N_3$, as the following values have been found on analysis:

|  | Found | Calculated |
|---|---|---|
|  | Percent | Percent |
| C | 74.22 / 74.03 | 74.37 |
| H | 6.72 / 6.80 | 6.51 |
| N | 10.96 / 10.82 | 10.85 |

By replacing tyramine by an equivalent quantity of hystamine and by working in an ethanol solution in presence of pyridine, lysergic acid-hystamide will be obtained. This compound shows the Keller's and Van Urk's reaction and behaves like an ergot-alkaloid.

EXAMPLE 5

*Preparation of d-lysergic acid-1-norephedride and l-lysergic acid-1-norephedride*

One part of the freshly prepared racemic lysergic acid azide is introduced at 0° C. into a solution of 1 part 1-norephedrine in 20 parts of ethanol, whereby on stirring, a solution occurs very rapidly. The solvent is then evaporated in vacuo, and the excess of norephedrine is separated by extracting the sticky residue several times with 20 parts of water. The resulting dry amorphous substance is then dissolved in 20 parts of absolute ethanol and to this solution is slowly added alcoholic phosphoric acid in an amount slightly superior to the equivalent quantity. The phosphate of the d-lysergic acid 1-norephedride, which is difficultly soluble in absolute alcohol, becomes thereby precipitated in form of white flocks, whereby the l-lysergic acid-1-norephedridephosphate remains in solution. This can be precipitated by an addition of ether and isolated. The phosphates are then separately dissolved in water and the free bases precipitated by addition of sodium bicarbonate. In order to obtain both bases in an optically pure state, the fractional precipitation of the phosphates from the alcoholic solutions can be repeated several times.

The d-lysergic acid-1-norephedride crystallizes out from ether in plates and possesses the optical rotation of $$[\alpha]_D^{22°C} = +296° \text{ C.}$$

The l-lysergic acid-1-norephedride is obtained from ether in form of long needles of FP.125–130° C. (corr.) and possesses the optical rotation of $$[\alpha]_D^{22°C} = -217° \text{ C.}$$

Both lysergic acid-norephedrides give the same color on Keller's color reaction as the natural alkaloids from ergot.

What we claim is:—

1. A process for the manufacture of lysergic acid amides, comprising condensing lysergic acid azide with an organic base containing at least one labile hydrogen-atom linked to the nitrogen.

2. A process for the manufacture of lysergic acid amides, comprising condensing lysergic acid azide with an organic base containing at least one labile hydrogen-atom linked to the nitrogen in presence of a solvent and an acid binding substance.

3. A process for the manufacture of lysergic acid amides, comprising condensing lysergic acid azide with an organic base, containing at least one labile hydrogen-atom linked to the nitrogen in presence of a solvent and an acid binding substance and at a temperature below 20° C.

4. A process for the manufacture of lysergic acid amides, comprising condensing lysergic acid azide with a primary organic base containing at least one labile hydrogen-atom linked to the nitrogen.

5. A process for the manufacture of lysergic acid amides, comprising condensing lysergic acid azide with a primary organic base in presence of an acid binding substance and a solvent at a temperature below 20° C.

6. A process for the manufacture of lysergic acid amides, comprising condensing lysergic acid azide with 2-amino-propanol-1 in presence of ethanol and of an excess of the base at a temperature of about 0° C.

7. A process for the manufacture of a lysergic acid amide, comprising condensing lysergic acid azide with tyramine in presence of an aqueous solution of sodium hydroxyde at a temperature of about 0° C.

8. A process for the manufacture of a lysergic acid amide, comprising condensing lysergic acid azide with a norephedrine in presence of ethanol and an excess of the base at a temperature of about 0° C.

9. The lysergic acid amides of organic bases, which are of the type of ergot alkaloids, which give the Keller's and Van Urk's color reactions and which are therapeutically useful compounds.

10. The lysergic acid amides of primary organic bases, which are of the type of ergot alkaloids, which give the Keller's and Van Urk's color reactions and which are therapeutically useful compounds.

11. The racemic lysergic acid isopropanolamide of the formula $C_{19}H_{23}O_2N_3$, which is a colorless crystalline compound, melting with decomposition at 220-225° C. and which gives the Keller's and Van Urk's color reactions of the ergot alkaloids.

12. The lysergic acid tyramide of the formula $C_{24}H_{25}O_2N_3$, which is a colorless compound crystallizing from acetone in form of prisms, melting with decomposition at 205-210° C. and which gives the Keller's and Van Urk's color reactions of the ergot alkaloids.

13. The lysergic acid norephedride of the formula $C_{25}H_{27}O_2N_3$, which is a colorless compound, melting with decomposition and which gives the Keller's and Van Urk's color reactions of the ergot alkaloids.

ARTHUR STOLL.
ALBERT HOFMANN.